June 15, 1954     B. LIEBOWITZ ET AL     2,681,020
APPARATUS FOR AND METHOD OF MANUFACTURING BIELASTIC TAPES
Filed May 23, 1952
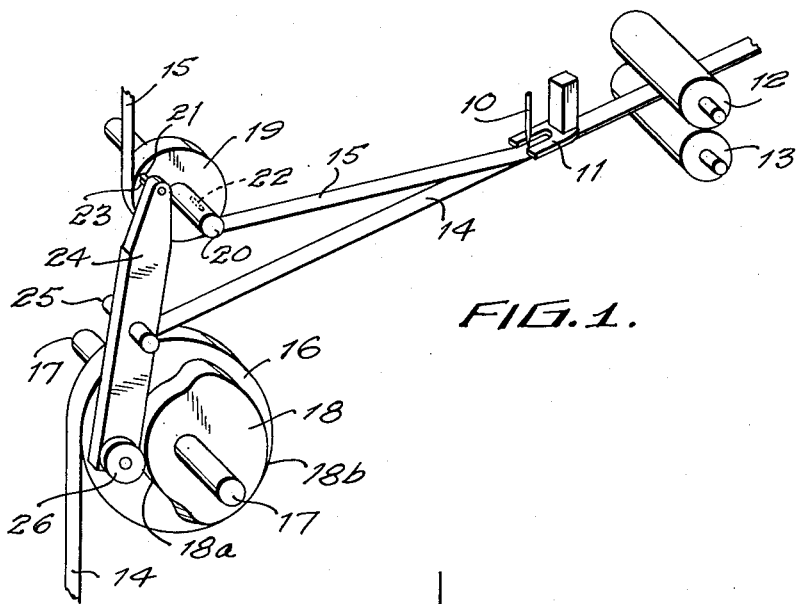
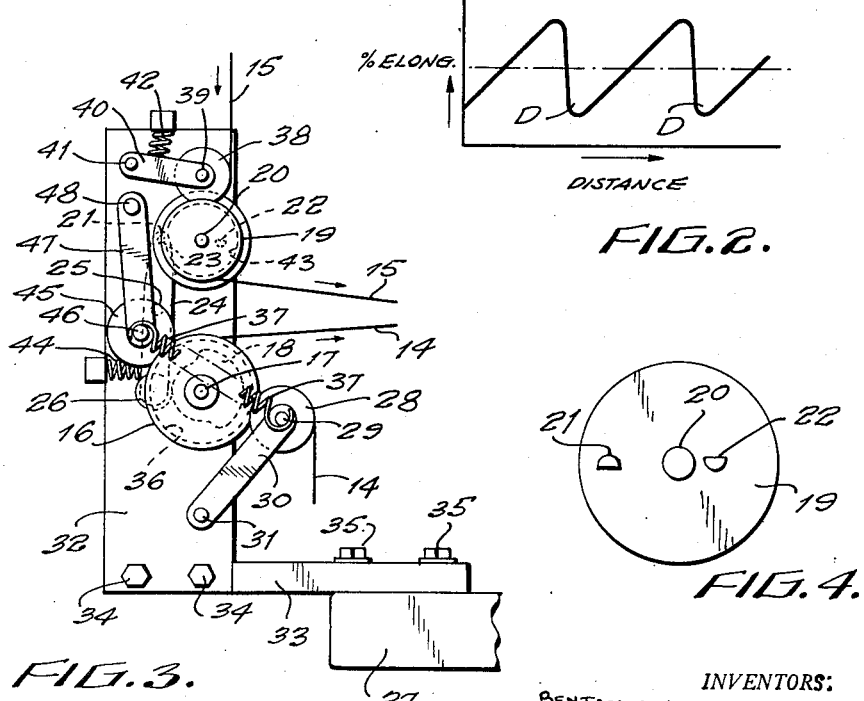
INVENTORS:
BENJAMIN LIEBOWITZ AND
THEODORE LOEW
BY Patented June 15, 1954

2,681,020

UNITED STATES PATENT OFFICE 2,681,020

APPARATUS FOR AND METHOD OF MANUFACTURING BIELASTIC TAPES

Benjamin Liebowitz, Lewisboro, N. Y., and Theodore Loew, Stamford, Conn.; said Loew assignor to said Liebowitz Application May 23, 1952, Serial No. 289,617

11 Claims. (Cl. 112—2)

In the copending U. S. Patent applications Serial No. 190,092, filed October 14, 1950 for "Wearing Apparel and Methods of Producing the Same," now Patent No. 2,601,035, dated June 17, 1952; Serial No. 199,317, filed December 5, 1950, for "Articles of Wearing Apparel," now Patent No. 2,601,036, dated June 17, 1952; Serial No. 217,341, filed March 24, 1951, for "Collars and Method for Preventing Curling of Collars," now Patent No. 2,601,037, dated June 17, 1952; and Serial No. 247,910, filed September 24, 1951, for "Anticurl Devices for Collars," now Patent No. 2,601,038, dated June 17, 1952, filed by Benjamin Liebowitz, devices are disclosed for causing a counter-curling tendency in a garment part to oppose the curling forces imposed on such garment part by the wearing thereof. For instance, the points of collars and the tops of girdles often tend to curl away from the body of the wearer; in the aforesaid applications it is shown how to oppose this curling tendency by anticurling forces produced by a bielastic structure comprising a flexible compression-resistant substantially non-stretchable element and a flexible permanently stretched elastic element attached in permanent tension-creating state to said compression-resistant element. Moreover, in patent application Serial No. 247,910, it is pointed out that a very significant improvement is obtained in the functioning of the anticurl devices by having variable tension in the elastic element so as to create anticurling forces which are stronger in some regions than in others.

The object of this invention is to provide methods and apparatus for the manufacture of such anticurl strips, viz. apparatus and methods for feeding two strips, one a flexible compression-resistant substantially non-stretchable tape and the other a flexible elastic substantially non-compression-resistant strip or tape, e. g. a rubber tape, at required relative rates into a uniting machine, e. g. a sewing machine, so that the resulting composite bielastic tape structure will have the desired stretch in the rubber; and where that stretch is variable, the desired distribution of stretch along its length.

Our method for producing bielastic anticurl strips with variable stretch and tension in the rubber makes use of the concept of not feeding the rubber tape during most of the time that the relatively non-stretchable tape is being fed, thereby stretching the rubber increasingly as the non-stretchable tape is fed continuously, and then momentarily releasing the rubber so as to reduce the stretch and tension to a predetermined minimum; then the feed of the rubber tape is stopped again, and the not feeding-releasing cycle is repeated periodically, as often as desired.

The apparatus for carrying out the above method will be understood by reference to the accompanying drawings, in which:

Fig. 1 is a diagrammatic isometric view of a device for feeding an elastic tape at a variable predetermined rate relative to the feeding of a relatively non-stretchable tape so as to produce an elongation in the elastic tape having a predetermined approximately "sawtooth" variation along the length of the composite bielastic tape;

Fig. 2 is a graph showing the variation of stretch or elongation as a function of the distance along the composite tape as produced by the apparatus of Fig. 1;

Fig. 3 is a side elevation of an apparatus operating on the same principles as the device shown in Fig. 1; and Fig. 4 is a side elevation of the roller 19 forming part of the apparatus shown in Fig. 3, carrying the pins 21 and 22.

Referring to Fig. 1, the needle of a sewing machine is diagrammatically indicated at 10 in association with the presser foot 11 of the machine. As a feeding mechanism on the sewing machine we prefer to employ a pair of feed rollers 12 and 13 behind the presser foot 11 instead of the usual feed-dog arrangement. These rollers are intermittently driven in proper relation to the needle motion so as to produce the desired feed.

The work being fed consists of two tapes, one shown at 14, being a compression-resistant relatively non-stretchable cotton or other tape, e. g. a woven tape treated with resin or a woven tape employing relatively large monofilaments in the warp. The other tape shown at 15 is an elastic tape preferably made of rubber, e. g. of the kind used in so-called elastic "garment tape." The compression-resistant non-stretchable tape 14 is pulled over a synchronizer roller 16 which rotates at such a rate that its peripheral speed is equal to the rate of feed of the feed rollers 12 and 13. In practice we have found that the best method in this type of apparatus for producing equality of rate of feed due to the feed rollers 12 and 13 and the rate of feed due to the rotation of the synchronizer roller 16 is to drive the synchronizer roller 16 by means of the non-stretchable tape 14 which is pulled at any desired rate by the feed rollers 12 and 13.

The synchronizer roller 16 is mounted on a shaft 17 which in turn is mounted in appropriate bearings not indicated in the diagrammatic Figure 1. Mounted on the same shaft is a cam 18 as shown. For stretching the rubber tape 15 we employ a stretching roller 19 which serves as blocking means and is carried on a separate shaft 20 which is parallel but spaced from the shaft 17 and mounted in appropriate bearings not shown in Figure 1. The stretching roller 19 is mounted so that its central plane is co-planar with the central plane of the synchronizer roller 16, which in general is an advantage.

The roller 19 carries a pair of pins 21 and 22, the latter shown dotted behind shaft 20. These pins 21 and 22 extend out from the side of the roller 19 in a direction parallel to the shaft 20. As seen more clearly in Figure 4, the two pins 21 and 22 are not only spaced apart 180° in angle, but they are also at different distances from the axis of the shaft 20. The tension of the elastic tape 15 constantly tends to rotate the roller 19 in the direction of feed (since the tension on the input side is zero or negligible). But during most of the time the roller 19 is prevented from rotating by the abutment of one of the two pins, e. g. pin 21 in Figure 1, against pin 23 which is mounted on the upper end of a lever 24 pivoted by means of a shaft 25 carried in appropriate bearings not shown in Figure 1.

The lower end of the lever 24 carries a cam follower 26 which bears against the cam 18. The cam 18 consists of two circular arcs, viz. a circular arc 18a of smaller radius and a circular arc 18b of larger radius. These two arcs are each a little less than 180° and the cam has a relatively steep rise and/or fall from one to the other so that during most of the time the lever 24 is in such a position that it will stop the rotation of the roller 19 by the abutment of either the pin 21 or 22 against the lever-carried pin 23.

That is, the two stationary positions of the lever 24 produced by the cam 18 in the course of its rotation are such that the roller 19 can not rotate because in one of these stationary positions the pin 21 abuts against the pin 23 whereas in the other position the pin 22 abuts against the pin 23. Hence, it is only during the transition produced by the sudden rise and/or fall of the cam 18 that a release of the abutting pins 21 or 22 occurs, thereby permitting the roller 19 to rotate under the influence of the tension of the elastic tape 15. But by the time the roller 19 has concluded a half revolution the lever 24 is in such position that the pin 23 abuts against the other pin, e. g. the pin 22 if the previously abutting pin was 21, and conversely 21 when the previously abutting pin was 22. Hence, each release allows the roller 19 to make just half of one revolution.

It will be seen that while the synchronizer roller 16 is being continuously rotated by the feed of the sewing machine mechanism, i. e. while the roller 16 is being driven continuously by the motion of the non-stretchable tape 14, the rubber tape is normally prevented from feeding by the abutment of the pins mentioned above except that every half revolution of the roller 16 causes the lever 24 to move so as to release the stretching roller 19 so that it can make precisely one-half revolution, and is then stopped once again.

The resulting variation in the tension or elongation of the rubber along the composite tape is shown in the graph of Figure 2: During the time that the rubber tape is not being fed the tension increases practically linearly with the distance. Then when the disengagement of the abutting pin occurs, so that the stretching roller 19 makes a half revolution, the stretch and tension drop suddenly to the initial value and then begin to climb again, thereby producing the "sawtooth" effect shown in Figure 2. This figure diagrammatically shows the instantaneous stretch, i. e. elongation and tension of the rubber as a function of the distance along the finished composite tape.

After the stitching, the composite bielastic tape is cut apart at points indicated by D in Figure 2 at or near minimum tension.

It will be understood that the working surfaces of the rollers 16 and 19 are preferably covered with emery cloth so as to provide a surface of very high friction between each roller and the respective tape. Idler rollers are omitted from Figure 1 for the sake of clarity, but are shown in the corresponding Figure 3.

It remains to describe a practical form of the apparatus diagrammatically illustrated in Figure 1. In Figure 3 showing such practical form, only the stretching end of the mechanism is shown, it being understood that the feeding and stitching mechanism and parts associated with it are the same as in Figure 1. Furthermore, it should be noted that identical parts are designated in Figures 1 and 3 with identical reference numerals.

In the apparatus shown in Figure 3, the relatively non-stretchable tape 14 comes up from below the sewing table 27 and passes around an idler roller 28 which rotates freely on pin 29 carried by the arm 30 which in turn is pivoted at 31 on a pin which is rigidly mounted on the upright member 32, the said upright member 32 constituting the foundation of the device.

Any convenient means may be employed for mounting the upright member 32 on the sewing machine tabe 27, e. g. by means of the bar 33, screws 35 and bolts 34.

On the upright member 32 are mounted the shaft 17 carrying the synchronizer roller 16 and shaft 20 carrying the stretching roller 19 in the same manner as described above in connection with the device shown in Figure 1.

Also in this apparatus cam 18 is mounted on shaft 17 and oscillates by means of the cam follower 26 the lever 24 supported by shaft 25 mounted on the upright member 32. The upper end of lever 24 carries the pin 23 which engages alternatively, as explained above, the pins 21 and 22 mounted on the stretching roller 19.

In order to guide tape 14, a groove 36 is provided in the peripheral face of roller 16. A spring 37 urges the idler 28 against the bottom of the groove 36 which, as heretofore stated, is surfaced with emery cloth. The non-stretchable tape 14 after passing over the idler roller 28 passes between the nip of the roller 28 and the working surface of groove 36. The tape 14 remains in contact with the groove 36 for about half a revolution, more or less, and emerges tangentially as shown in Figure 3. Hence, the rate of feed of tape 14, as determined by the rollers 12 and 13 of the sewing machine, determines the rate of rotation of roller 16.

The rubber tape 15 comes from above and passes partway around an idler roller 38 which is mounted to rotate freely on the pin 39 carried by the arm 40 which is pivotally mounted at 41 on a pin carried by the upright member 32. A spring 42 urges the arm 40 downward so as to press the idler roller 38 against the bottom of groove 43 cut in roller 19 and surfaced with emery cloth. The rubber tape 15 remains in contact with the said bottom of groove 43 for approximately 180° and then leaves the same tangentially as shown.

As stated above, the purpose of Figure 3 is merely to show a more practical arrangement of the parts. Thus, in Figure 3 a spring is shown at 44 which urges the cam follower 26 against the cam 19. In addition to the idler roller 28, an additional idler roller may be used as shown at 45 rotating freely on pin 46 carried on the arm 47 pivoted at 48 on a pin which is rigidly mounted on the upright member 32. The two idler rollers 28 and 45 may be urged by the same spring 37 against the working surface of the groove 36 of the roller 16. This arrangement insures that there will be no slippage between the non-stretchable tape 14 and the bottom of groove 36, so that the rate of rotation of the roller 16 will be rigorously determined by the rate of feed of the tape 14. Likewise a pair of idler rollers spaced approximately 180° apart may be advantageously used instead of the single idler roller 38 to press the rubber tape 15 against the bottom of groove 43 of roller 19, but in the interest of clarity, this second idler roller is omitted from the drawing. The operation of the mechanism in Figure 3 will be further understood by the description of the method and apparatus of Figure 1.

To avoid unnecessarily cumbersome language, we have referred to the feed produced by the rollers 12 and 13 as "continuous," also implying that it is "uniform" in contrast to the variable rate of feeding of the rubber tape in the apparatus of Figure 1. As a matter of fact, as everyone skilled in the art knows, on most sewing machines the feed produced by the rollers 12 and 13 would actually be far from continuous; for instance, if the machine makes 3,600 stitches per minute, the feed rolls 12 and 13 will start and stop 60 times per second, so that there is no feed during the interval when the needle 10 is in the work. Due to elasticity of tape 14, which drives the roller 16 (despite the fact that the said tape has been described as substantially non-stretchable), and also due to the elasticity of other parts, and due finally to the inertia of all the parts which are moved when the tape 14 is fed by the rollers 12 and 13, the intermittent feeding of the work by the rollers 12 and 13 will be, to some extent, smoothed out so that the motion of the roller 16 and all parts associated with it will not follow rigorously the intermittent motion of the rollers 12 and 13. Instead, the motion of the roller 16 and its associated parts will be a "rippling" one which, for practical purposes associated with this invention may be regarded as "continuous," since the ripples will occur at a rate of about 60 ripples per second, more or less. However, the ripples may be reduced to insignificance by interposing an additional elastic element in the path of the tape 14, such as a flexibly mounted roller over which the tape 14 must pass in going to the needle.

What we claim is:

1. Apparatus for manufacturing a bielastic tape structure comprising in combination continuously operative feeding means for pulling along predetermined paths a substantially non-stretchable supporting tape and an elastic tape; uniting means associated with said feeding means for uniting said tapes along their lengths in superimposed relation; feed blocking means arranged in the path of the pulled elastic tape at a control point spaced from and before said uniting means, adjustable between stopping configuration which prevents feeding movement of said elastic tape at said control point and releasing configuration which allows free feeding movement of said elastic tape at said control point; and automatic cyclical adjusting means for cyclically and automatically moving said feed blocking means between stopping and releasing configurations in synchronism with movement of said feeding means, thereby intermittently blocking feeding movement of said elastic tape at said control point while pulling of said elastic tape by said feeding means continues so as to cause during each such blocking period the stretch of the elastic tape between said feed blocking means and said uniting means to increase steadily from a minimum to a maximum, and after each of said blocking periods releasing said elastic tape so as to permit the stretch of the same between said feed blocking means and said uniting means to quickly decrease from the maximum attained during the preceding blocking period to the original minimum, thus obtaining by the coaction of said uniting means, said feed blocking means and said actuating means a continuous bielastic tape structure composed of said elastic tape fastened to one face of said supporting tape and having in direction of its length consecutive zones of predetermined length in each of which the stretch of said elastic tape varies between a maximum in the region of one end thereof and a minimum in the region of the other end thereof.

2. Apparatus for manufacturing a bielastic tape structure comprising in combination continuously operative feeding means for pulling along predetermined paths a substantially non-stretchable supporting tape and an elastic tape; uniting means associated with said feeding means for uniting said tapes along their lengths in superimposed relation; a guiding roller arranged at a control point spaced from said uniting means in the path of said elastic tape non-slidably engaging the same, said guiding roller blocking feeding movement of said elastic tape at said control point when prevented from rotating and permitting free feeding movement of said pulled elastic tape at said control point when permitted to rotate; means mounting said guiding roller for rotation; and cyclical actuating means for cyclically preventing and permitting rotation of said guiding roller, thereby intermittently blocking feeding movement of said elastic tape at said control point while pulling of said elastic tape by said feeding means continues so as to cause during each such blocking period the stretch of the elastic tape between said guiding roller and said uniting means to increase steadily from a minimum to a maximum, and after each of said blocking periods releasing said elastic tape so as to permit the stretch of the same between said guiding roller and said uniting means to quickly decrease from the maximum attained during the preceding blocking period to the original minimum, thus obtaining by the coaction of said uniting means, said guiding roller and said actuating means a continuous bielastic tape structure composed of said elastic tape fastened to one face of said supporting tape and having in direction of its length consecutive zones of predetermined length in each of which the stretch of said elastic tape varies between a maximum in the region of one end thereof and a minimum in the region of the other end thereof.

3. Apparatus for manufacturing a bielastic tape structure comprising in combination continuously operative feeding means for pulling along predetermined paths a substantially non-stretchable supporting tape and an elastic tape; uniting means associated with said feeding means for uniting said tapes along their lengths in superimposed relation; a guiding roller arranged at a control point spaced from said uniting means in the path of said elastic tape non-slidably engaging the same, said guiding roller blocking feeding movement of said elastic tape at said control point when prevented from rotating and permitting free feeding movement of said pulled elastic tape at said control point when permitted to rotate; means mounting said guiding roller for rotation; and cyclical actuating means arranged partly in the path of the continuously pulled supporting tape and being actuated by the same during movement thereof, said cyclical actuating means cyclically preventing and permitting rotation of said guiding roller, thereby intermittently blocking feeding movement of said elastic tape at said control point while pulling of said elastic tape by said feeding means continues so as to cause during each such blocking period the stretch of the elastic tape between said guiding roller and said uniting means to increase steadily from a minimum to a maximum, and after each of said blocking periods releasing said elastic tape so as to permit the stretch of the same between said guiding roller and said uniting means to quickly decrease from the maximum attained during the preceding blocking period to the original minimum, thus obtaining by the coaction of said uniting means, said guiding roller and said actuating means a continuous bielastic tape structure composed of said elastic tape fastened to one face of said supporting tape and having in direction of its length consecutive zones of predetermined length in each of which the stretch of said elastic tape varies between a maximum in the region of one end thereof and a minimum in the region of the other end thereof.

4. Apparatus for manufacturing a bielastic tape structure comprising in combination continuously operative feeding means for pulling along predetermined paths a substantially non-stretchable supporting tape and an elastic tape; uniting means associated with said feeding means for uniting said tapes along their lengths in superimposed relation; feed blocking means arranged in the path of the pulled elastic tape at a control point spaced from said uniting means, adjustable between stopping configuration which prevents feeding movement of said elastic tape at said control point and releasing configuration which allows free feeding movement of said elastic tape at said control point; a synchronizer roller arranged in the path of the continuously pulled supporting tape and being rotated by the same during feeding movement thereof; means mounting said synchronizer roller for rotation; and motion transmitting cyclical actuating means operated by said synchronizer roller for cyclically moving said feed blocking means between stopping and releasing configurations, thereby intermittently blocking feeding movement of said elastic tape at said control point while pulling of said elastic tape by said feeding means continues so as to cause during each such blocking period the stretch of the elastic tape between said feed blocking means and said uniting means to increase steadily from a minimum to a maximum, and after each of said blocking periods releasing said elastic tape so as to permit the stretch of the same between said feed blocking means and said uniting means to quickly decrease from the maximum attained during the preceding blocking period to the original minimum, thus obtaining by the coaction of said uniting means, said synchronizer roller, said motion transmitting cyclical actuating means and said feed blocking means a continuous bielastic tape structure composed of said elastic tape fastened to one face of said supporting tape and having in direction of its length consecutive zones of predetermined length in each of which the stretch of said elastic tape varies between a maximum in the region of one end thereof and a minimum in the region of the other end thereof.

5. Apparatus for manufacturing a bielastic tape structure comprising in combination continuously operative feeding means for pulling along predetermined paths a substantially non-stretchable supporting tape and an elastic tape; uniting means associated with said feeding means for uniting said tapes along their lengths in superimposed relation; a guiding roller arranged at a control point spaced from said uniting means in the path of said elastic tape non-slidably engaging the same, said guiding roller blocking feeding movement of said elastic tape at said control point when prevented from rotating and permitting free feeding movement of said pulled elastic tape at said control point when permitted to rotate; a synchronizer roller arranged in the path of the continuously pulled supporting tape and being rotated by the same during feeding movement thereof; means mounting said guiding and synchronizer rollers for rotation; and motion transmitting cyclical actuating means for cyclically preventing and permitting rotation of said guiding roller, thereby intermittently blocking feeding movement of said elastic tape at said control point while pulling of said elastic tape by said feeding means continues so as to cause during each such blocking period the stretch of the elastic tape between said guiding roller and said uniting means to increase steadily from a minimum to a maximum, and after each of said blocking periods releasing said elastic tape so as to permit the stretch of the same between said guiding roller and said uniting means to quickly decrease from the maximum attained during the preceding blocking period to the original minimum, thus obtaining by the coaction of said uniting means, said guiding roller, said synchronizer roller and said motion transmitting cyclical actuating means a continuous bielastic tape structure composed of said elastic tape fastened to one face of said supporting tape and having in direction of its length consecutive zones of predetermined length in each of which the stretch of said elastic tape varies between a maximum in the region of one end thereof and a minimum in the region of the other end thereof.

6. Apparatus for manufacturing a bielastic tape structure comprising in combination continuously operative feeding means for pulling along predetermined paths a substantially non-stretchable supporting tape and an elastic tape; uniting means associated with said feeding means for uniting said tapes along their lengths in superimposed relation; a guiding roller arranged at a control point spaced from said uniting means in the path of said elastic tape non-slidably engaging the same, said guiding roller blocking feeding movement of said elastic tape at said control point when prevented from rotating and permitting free feeding movement of said pulled elastic tape at said control point when permitted to rotate; means mounting said guiding roller for rotation; two blocking pins on one side face of said guiding roller arranged at different distances from the axis of rotation thereof and on opposite sides of said axis so that said blocking pins turn through two different circular paths, respectively, during rotation of said guiding roller; and cyclical actuating means including a blocking member cyclically moving between one blocking position located in the circular path of one of said blocking pins and another blocking position located in the circular path of the other blocking pin and alternately engaging said blocking pins for preventing in each of said blocking positions turning of said guiding roller while permitting during movement between said positions rotation of said guiding roller, thereby intermittently blocking feeding movement of said elastic tape at said control point while pulling of said elastic tape by said feeding means continues so as to cause during each such blocking period the stretch of the elastic tape between said guiding roller and said uniting means to increase steadily from a minimum to a maximum, and after each of said blocking periods releasing said elastic tape so as to permit the stretch of the same between said guiding roller and said uniting means to quickly decrease from the maximum attained during the preceding blocking period to the original minimum, thus obtaining by the coaction of said uniting means, said guiding roller, said blocking pins and said cyclical actuating means a continuous bielastic tape structure composed of said elastic tape fastened to one face of said supporting tape and having in direction of its length consecutive zones of predetermined length in each of which the stretch of said elastic tape varies between a maximum in the region of one end thereof and a minimum in the region of the other end thereof.

7. Apparatus for manufacturing a bielastic tape structure comprising in combination continuously operative feeding means for pulling along predetermined paths a substantially non-stretchable supporting tape and an elastic tape; uniting means associated with said feeding means for uniting said tapes along their lengths in superimposed relation; a guiding roller arranged at a control point spaced from said uniting means in the path of said elastic tape non-slidably engaging the same, said guiding roller blocking feeding movement of said elastic tape at said control point when prevented from rotating and permitting free feeding movement of said pulled elastic tape at said control point when permitted to rotate; means mounting said guiding roller for rotation; two blocking pins on one side face of said guiding roller arranged at different distances from the axis of rotation thereof and on opposite sides of said axis so that said blocking pins respectively turn through two different circular paths during rotation of said guiding roller; and cyclical actuating means arranged partly in the path of said continuously pulled supporting tape and being actuated by the same during feeding movement thereof, said cyclical actuating means including a blocking member cyclically moving between one blocking position located in the circular path of one of said blocking pins and another blocking position located in the circular path of the other blocking pin and alternately engaging said blocking pins for preventing in each of said blocking positions turning of said guiding roller while permitting during movement between said positions rotation of said guiding roller, thereby intermittently blocking feeding movement of said elastic tape at said control point while pulling of said elastic tape by said feeding means continues so as to cause during each such blocking period the stretch of the elastic tape between said guiding roller and said uniting means to increase steadily from a minimum to a maximum, and after each of said blocking periods releasing said elastic tape so as to permit the stretch of the same between said guiding roller and said uniting means to quickly decrease from the maximum attained during the preceding blocking period to the original minimum, thus obtaining by the coaction of said uniting means, said guiding roller, said blocking pins and said cyclical actuating means a continuous bielastic tape structure composed of said elastic tape fastened to one face of said supporting tape and having in direction of its length consecutive zones of predetermined length in each of which the stretch of said elastic tape varies between a maximum in the region of one end thereof and a minimum in the region of the other end thereof.

8. Apparatus for manufacturing a bielastic tape structure comprising in combination continuously operative feeding means for pulling along predetermined paths a substantially non-stretchable supporting tape and an elastic tape; uniting means associated with said feeding means for uniting said tapes along their lengths in superimposed relation; a guiding roller arranged at a control point spaced from said uniting means in the path of said elastic tape non-slidably engaging the same, said guiding roller blocking feeding movement of said elastic tape at said control point when prevented from rotating and permitting free feeding movement of said pulled elastic tape at said control point when permitted to rotate; means mounting said guiding roller for rotation; two blocking pins on one side face of said guiding roller arranged at different distances from the axis of rotation thereof and on opposite sides of said axis so that said blocking pins respectively turn through two different circular paths during rotation of said guiding roller; a synchronizer roller arranged in the path of the continuously pulled supporting tape and being rotated by the same during feeding movement thereof; means mounting said synchronizer roller for rotation; a blocking member; and cyclical motion transmitting actuating means connecting said synchronizer roller with said blocking member for cyclically moving said blocking member between one blocking position located in the circular path of one of said blocking pins to engage said one blocking pin and another blocking position located in the circular path of the other blocking pin to engage said other blocking pin for preventing in each of said blocking positions turning of said guiding roller while permitting during movement between said positions rotation of said guiding roller, thereby intermittently blocking feeding movement of said elastic tape at said control point while pulling of said elastic tape by said feeding means continues so as to cause during each such blocking period the stretch of the elastic tape between said guiding roller and said uniting means to increase steadily from a minimum to a maximum, and after each of said blocking periods releasing said elastic tape so as to permit the stretch of the same between said guiding roller and said uniting means to quickly decrease from the maximum attained during the preceding blocking period to the original minimum, thus obtaining by the coaction of said uniting means, said guiding roller, said blocking pins and said cyclical actuating means a continuous bielastic tape structure composed of said elastic tape fastened to one face of said supporting tape and having in direction of its length consecutive zones of predetermined length in each of which the stretch of said elastic tape varies between a maximum in the region of one end thereof and a minimum in the region of the other end thereof.

9. Method of manufacturing connected bielastic tape elements comprising in combination the steps of pulling into a uniting means superimposed and facing each other a substantially non-stretchable supporting tape and an elastic tape; intermittently stopping motion of said pulled elastic tape at a control point spaced from said uniting means while continuing pulling thereof so as to cause during such intermittent stopping periods the stretch of the pulled tape between said control point and the uniting means slowly to increase from a minimum to a maximum, and after each of said stopping periods feeding a predetermined length of the pulled elastic tape so as to permit the stretch of the same between said control point and said uniting means quickly to decrease from the attained maximum to the original minimum; and fastening said pulled tapes in said uniting means to each other, thus obtaining a continuous bielastic tape structure composed of said elastic tape fastened to one face of said supporting tape and having in direction of its length consecutive zones in each of which the stretch of said elastic tape varies between a maximum in the region of one end thereof and a minimum in the region of the other end thereof.

10. Apparatus for manufacturing a bielastic tape structure comprising in combination continuously operative feeding means for pulling along predetermined paths a substantially non-stretchable supporting tape and an elastic tape; uniting means associated with said feeding means for uniting said tapes along their lengths in superimposed relation; combined metering and feed blocking means arranged in the path of the pulled elastic tape ahead of said uniting means, adjustable between stopping configuration which prevents feeding movement of said elastic tape and releasing configuration which allows free feeding movement of a predetermined length of said elastic tape; and cyclical adjusting means for cyclically moving said combined metering and feed blocking means between stopping and releasing configurations in synchronism with movement of said feeding means, thereby intermittently blocking feeding movement of said elastic tape at said control point while pulling of said elastic tape by said feeding means continues so as to cause during each such blocking period the stretch of the elastic tape between said feed blocking means and said uniting means to increase steadily from a minimum to a maximum, and after each of said blocking periods releasing said elastic tape so as to permit the stretch of the same between said feed blocking means and said uniting means to quickly decrease from the maximum attained during the preceding blocking period to the original minimum, thus obtaining by the coaction of said uniting means, said feed blocking means and said actuating means a continuous bielastic tape structure composed of said elastic tape fastened to one face of said supporting tape and having in direction of its length consecutive zones of predetermined length in each of which the stretch of said elastic tape varies between a maximum in the region of one end thereof and a minimum in the region of the other end thereof.

11. Apparatus for manufacturing a bielastic tape structure comprising in combination continuously operative feeding means for pulling along predetermined paths a substantially non-stretchable supporting tape and an elastic tape; uniting means associated with said feeding means for uniting said tapes along their lengths in superimposed relation; a stretching roller arranged ahead of said uniting means in the path of said elastic tape non-slidably engaging the same, said metering roller blocking feeding movement of said elastic tape when prevented from rotating and permitting free feeding movement of a predetermined length of said pulled elastic tape when permitted to rotate; means mounting said metering roller for rotation; and cyclical actuating means for cyclically preventing and permitting rotation of said metering roller, thereby intermittently blocking feeding movement of said elastic tape while pulling of said elastic tape by said feeding means continues so as to cause during each such blocking period the stretch of the elastic tape between said metering roller and said uniting means to increase steadily from a minimum to a maximum, and after each of said blocking periods releasing said elastic tape so as to feed a predetermined length of said elastic tape so as to permit the stretch of the same between said metering roller and said uniting means to quickly decrease from the maximum attained during the preceding blocking period to the original minimum, thus obtaining by the coaction of said uniting means, said metering roller and said actuating means a continuous bielastic tape structure composed of said elastic tape fastened to one face of said supporting tape and having in direction of its length consecutive zones of predetermined length in each of which the stretch of said elastic tape varies between a maximum in the region of one end thereof and a minimum in the region of the other end thereof.

References Cited in the file of this patent

UNITED STATES PATENTS

| Number | Name | Date |
|---|---|---|
| 1,277,004 | Weis | Aug. 27, 1918 |